Oct. 26, 1943.   W. BRENNER   2,332,504
SUPPORTING DEVICE
Filed April 17, 1940
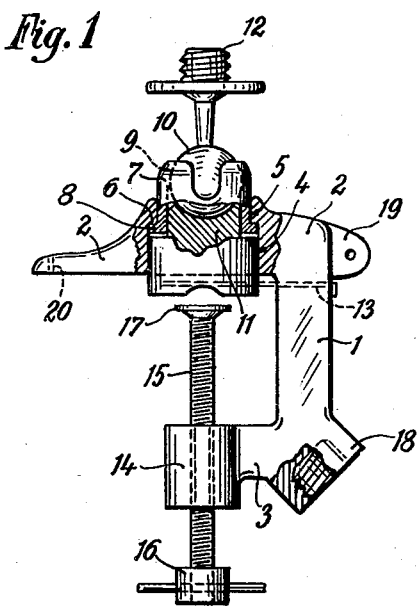
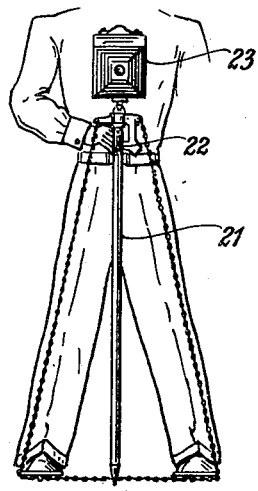
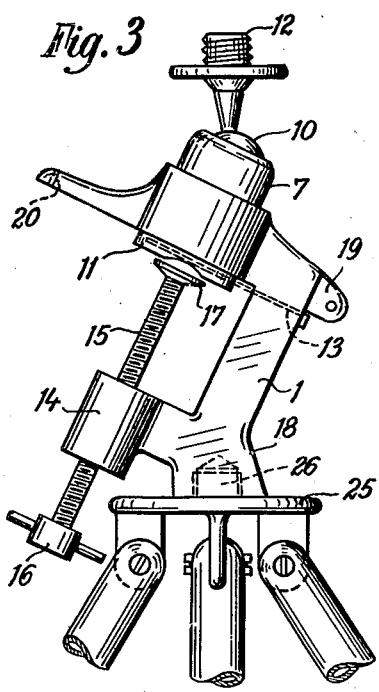
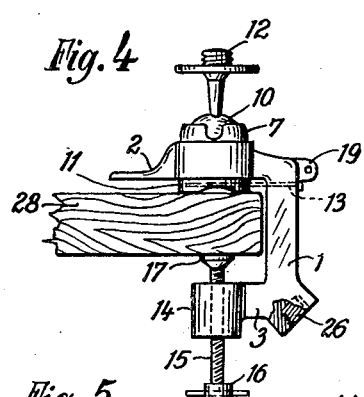
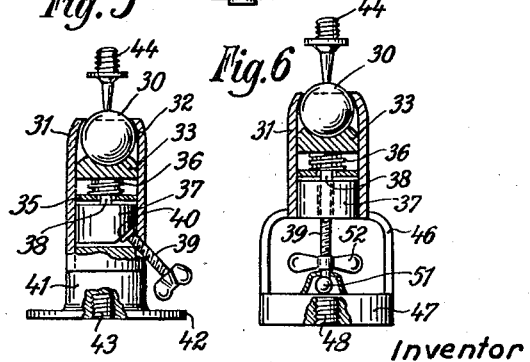
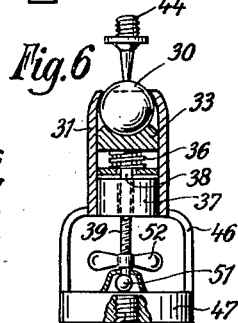
Inventor
W. Brenner
By E. F. Wendiroth
Attorney Patented Oct. 26, 1943

2,332,504

UNITED STATES PATENT OFFICE 2,332,504

SUPPORTING DEVICE

Wilhelm Brenner, Berlin, Germany; vested in the Alien Property Custodian

Application April 17, 1940, Serial No. 330,175
In Germany May 2, 1939

4 Claims. (Cl. 248—181)

My invention relates to improvements in stands and universal joints therefor, and more particularly in stands such as are used for supporting cameras and other apparatus in such a way that the said apparatus can be set at different angles relatively to the stand, the universal joint being provided for permitting such adjustment. One of the objects of the improvements is to provide a stand which is adapted to be used on supports of different shape, for example on a table having three legs secured thereto, on a supporting member having a single leg adapted to be supported on the ground and a chain or chains for holding the same in position by means of the feet of the attendant, or on a board or table. With this object in view my invention consists in constructing a stand in the form of a screw clamp having the universal joint supporting the apparatus mounted on one arm and the clamping screw in the other arm, the said stand being provided with a screw-threaded nipple. A stand of this construction may be clamped on a board, the arm carrying the universal joint bearing on the top face of the said board and the screw engaging the bottom face thereof, or it may be placed with its nipple on a table having a screw or nut adapted for engagement with said screw-threaded nipple.

Another object of the improvements is to provide a stand of the type indicated in which the universal joint may be readily set into different angular positions, and, thereafter, clamped in the set positions, and with this object in view my invention consists in providing a spring in connection with the universal joint adapted to hold the parts thereof in frictional engagement and so that the joint may be readily adjusted by the hand of the attendant, and means, such as a screw for positively clamping the universal joint in set position. In the preferred construction the said screw is used as the screw member of the screw clamp, the said screw having the function first to fix the stand on a table, and second to fix the parts of the universal joint in position.

For the purpose of explaining the invention several examples embodying the same have been shown in the accompanying drawing in which the same reference characters have been used in all the views to indicate corresponding parts. In said drawing, Fig. 1 is an elevation partly in section showing the stand or supporting device, Fig. 2 is a somewhat diagrammatical elevation showing the stand or supporting device mounted on a rod adapted to be supported on the ground, Fig. 3 is an elevation of the stand shown in Fig. 1 showing the same mounted on a table having three legs hinged thereto, Fig. 4 is an elevation of the stand mounted on a board, Fig. 5 is an elevation partly in section showing a modification of the universal joint, and Fig. 6 is a similar elevation showing another modification.

In the construction shown in Fig. 1 the stand comprises a supporting member 1 having an upper arm 2 and a lower arm 3. The upper arm 2 is provided with a bore comprising a lower portion 4 of larger diameter and an upper portion 5 of reduced diameter providing an annular shoulder 6. The upper portion 5 of the said bore and the shoulder 6 provide a seat for a sleeve 7 and its flange 8, the said sleeve being formed at its top with an annular spherical seat 9. Within the said sleeve and bearing on the said seat there is a ball or similar supporting member 10 formed with a spherical surface, and the said supporting member is held in position by means of a cylindrical block 11 formed at its top with a spherical cavity corresponding to the spherical surface of the said supporting member. As shown the said block is guided in the portion 4 of larger diameter of the bore and it projects with a portion reduced in diameter into the sleeve, a suitable clearance being provided between the bottom face of the flange 8 and the block 11 to permit clamping engagement of the said block with the supporting member 10. In the construction shown in the figure the supporting member 10 carries a screw-threaded nipple 12 adapted to have an apparatus such as a camera fixed thereto.

To the supporting member 1 a leaf spring 13 is secured which engages in a diametrical groove made in the bottom part of the block 11, and which urges the said block upwardly and into frictional engagement with the spherical supporting member 10, the power of the said spring being such that it permits the supporting member or ball 10 to be readily set within the sleeve 7 at different angles and holds the same in set position. In an internally screw-threaded eye 14 a screw 15 is mounted which carries a handle 16 at its lower end and a head 17 at its top end, the said head being adapted to engage the bottom face of the block 11 and to force the same upwardly and into engagement with the ball 10 for rigidly fixing the same within the sleeve. As shown the block 11 projects downwardly beyond the bottom face of the arm 2.

The supporting member 1 is formed with an internally screw-threaded nipple 18. At opposite sides of the bore 4, 5 eyes 19 and 20 are provided respectively on the supporting member 1 and the arm 2, the said eyes being adapted to have the ends of a chain 21 attached thereto.

In Figs. 2 to 4 I have illustrated the manner of using the stand.

In the construction shown in Fig. 2 the stand is mounted on a cane 21 adapted to be supported on the ground. As shown the crutch 22 of the said cane is placed between the arms 2 and 3 and the head 17 and the bottom face of the block 11, and it is clamped between the said parts by screwing the screw 15 inwardly. To the eyes 19 and 20 the ends of the chain 21 are attached. The rod 21 is forced into the ground, and the photographer sets his feet on the bottom part of the chain spreading the same apart so as to hold the stand 1 and the camera 23 mounted thereon in position. Before making a photograph, the camera 23 is set into the proper angular position on the stand 1, and for this purpose the screw 15 is first screwed downwardly, so that it releases the block 11. Now the said block is held in loose frictional engagement with the ball 10, so that the said ball and the camera mounted thereon may be readily set into the desired angular position, the power of the spring 13 being sufficient loosely to hold the camera in the said position. Now the screw 15 is again screwed upwardly and into position for forcing the block 11 upwardly, which therefore presses the ball 10 on its seat.

In Fig. 3 I have illustrated the manner of mounting the stand 1 on a tripod 25. The table of the said tripod has a short screw 26 fixed thereto, and the stand 1 is screwed on the said screw with its internally screw-threaded nipple 18. Thus the stand is disposed angularly of the vertical axis of the tripod. The screw 15 is directed laterally of the table of the tripod 25 so that it can be turned without being interferred with by the said table.

After the stand has thus been fixed on the tripod 25 the ball 10 is set into the proper position, while the screw 15 is out of engagement with the block 11, and the ball is held by the spring 13 in frictional engagement with the seat 9. After the ball 10 has thus been set the screw 15 is screwed inwardly and into position for rigidly clamping the ball 10 on its seat.

In Fig. 4 I have illustrated the manner of mounting the stand 1 on a board 28, for example the board of a table. As shown the arms 2 and 3 straddle the said board, the block 11 bears on the top face and the head 17 of the screw 15 on the bottom face of the said board. The ball 10 is first set into the desired position while the screw 15 is loose, and thereafter the said screw is screwed inwardly and into clamping engagement with the block 11. Now the screw has two functions, first to clamp the stand 1 in position on the board 28, and second to force the block 11 upwardly and into clamping engagement with the ball 10. This double function is possible because the block 11 projects downwardly beyond the arm 2.

In Fig. 5 I have shown a modification of the universal joint on which the camera or similar apparatus is mounted. It will be understood that the device shown in the said figure may be mounted on a stand in the form of a screw clamp similar to the one illustrated in Fig. 1, or that it may be mounted on another support such as the tripod 25 shown in Fig. 3.

The spherical supporting member or ball on which the camera or other apparatus is to be mounted is mounted within its sleeve in a similar way as has been described with reference to Fig. 1, a spring being provided for frictionally holding the said ball in position and a screw being provided for clamping the ball in set position.

A ball 30 is located in a cylindrical sleeve 31 which is reduced in diameter at its top part to provide a seat 32. Within the sleeve there is a block 33 which is formed with a spherical top face engaging the bottom part of the ball 30. Below the block 33 a disk 35 is fixed to the sleeve, and the said disk provides a support for a coiled spring 36 engaging the block 33 and holding the same in frictional engagement with the seat 32. Below the said disk 35 a cylindrical slide 37 is mounted within the sleeve which is formed with an axial pin 38 projecting through a central bore made in the disk 35 and engaging the bottom face of the block 33. The slide 37 is adapted to be forced upwardly by means of a screw 39 passed through the wall of the sleeve 31 and disposed angularly thereof and bearing on a bevelled face 40 of the slide 37. The bottom part of the sleeve 31 is fixed to a cylindrical base 41 provided with a flange 42 and having an internally screw-threaded socket 43.

Normally the block 33 is acted upon only by the spring 36, so that the ball 30 is in loose frictional engagement with the seat 32. Thus the said ball and the apparatus fixed to the screw 44 carried by the ball may be set into the proper position, and thereafter the screw 39 is screwed inwardly thus forcing the slide 37 upwardly and clamping the ball 30 on its seat.

The sleeve may be mounted on any suitable support, for example on any of the supports illustrated in Figs. 1 to 4, and it will be understood that the ball 30 and the camera or other apparatus carried thereby may be clamped in the proper position after the sleeve has thus been fixed to its support.

In Fig. 6 I have shown another modification which is similar to the one illustrated in Fig. 5, and the same letters of reference have been used to indicate corresponding parts. As distinguished from the construction shown in Fig. 5, the sleeve 31 is supported by means of arms 46 on a base 47 formed with an internally screw-threaded socket 48 by means of which the base and the parts carried thereby may be mounted on a suitable support such as has been described with reference to Figs. 1 to 4. The slide 37 is formed with an internally screw-threaded bore engaged by a screw guided with its bottom end in a bail 51 and carrying a handle 52.

The device shown in Fig. 6 is first mounted on a suitable support, the screw 50 is turned in a direction for moving the slide 37 downwardly and out of clamping engagement with the ball 30, the said ball is set at the desired angle, and it is temporarily held in the set position by means of the spring 36. Finally the screw 50 is turned in a direction for forcing the slide 37 upwardly thus rigidly clamping the ball 30 on its seat.

I claim:

1. A support having two spaced arms, a sleeve mounted on one of said arms and formed with an annular seat, a screw mounted in the other arm of said support axially of said sleeve, a supporting member having a spherical surface bearing on said seat, a block slidable within said sleeve and projecting therefrom in position for forcing said member onto said seat, and a spring acting on said block in a direction for forcing said member into frictional engagement with said seat, said block being in position for being acted upon by said screw in a direction for forcing said member onto its seat.

2. In a ball and socket joint comprising a sleeve formed with an annular seat, a member having a spherical surface located within said sleeve and bearing on said seat, a block slidable within said sleeve and projecting therefrom in position for forcing said member onto said seat, and releasable means acting on said block for rigidly forcing the said member onto its seat, the improvement herein described which consists of a spring acting on said block and holding said member in frictional loose engagement with said seat.

3. In a supporting device of the kind which is detachably secured to an independent structure and which has a base member engageable with said structure, a universal joint having relatively movable parts carried by the base member, and a supporting member carried by one of the movable parts of the universal joint to provide mounting means for apparatus supported by the device, the combination of resilient means carried by said base member for holding the parts of the universal joint in loose frictional engagement with each other, and releasable means on the base member for simultaneously holding the parts of the universal joint in fixed relation to each other and for securing the supporting device to said structure with which the base is engaged.

4. In a supporting device of the kind which is detachably secured to an independent structure and which has a base member engageable with said structure, a universal joint having relatively movable parts carried by the base member, and a supporting member carried by one of the movable parts of the universal joint to provide mounting means for apparatus supported by the device, the combination of a pair of spaced arms on said base member, said universal joint being carried by one of said arms, resilient means on the base member for holding the parts of the universal joint in loose frictional engagement with each other, and releaseable means carried by the second arm for simultaneously holding the parts of the universal joint in fixed relation to each other and for securing the arms of the supporting device to said structure, said releaseable means comprising a screw which extends through said second arm and which is movable towards and away from said universal joint.

WILHELM BRENNER.